3,137,705
HYDROXYLAMINO COMPOUNDS

Vladimir Prelog, Zurich, Ernst Vischer, Basel, Hans Bickel, Binningen, and Bruno Fechtig, Basel, Switzerland, assignors to Ciba Corporation, a corporation of Delaware
No Drawing. Filed Mar. 7, 1961, Ser. No. 93,837
Claims priority, application Switzerland Apr. 8, 1960
2 Claims. (Cl. 260—326)

It was found that on hydrolysing ferrimycins (cf. U.S. patent application Serial No. 57,834, filed September 22, 1960, by Ernst Gaeumann et al.) 5-hydroxylaminopentylamine-(1) is obtained.

The present invention provides a process for the manufacture of hydroxylaminoalkylamines, more especially of compounds of the general formula

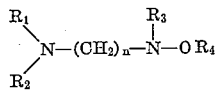

and of their salts in which $R_1$ to $R_4$ stand for hydrogen atoms, alkyl radicals, more especially lower alkyl radicals, aryl radicals such as phenyl, dinitrophenyl or acyl radicals such as alkanoyl, aroyl or aralkanoyl especially lower alkanoyl, benzoyl, naphthoyl, phthaloyl, phenylacetyl, carbobenzoxy, and $n$ is a whole number from 4–10 more especially of 5-hydroxylamino-pentylamine-(1) and its salts.

The new compounds may be used as intermediates in the synthesis of ferrioxamines or as precursors in the fermentative preparation of sideramycins and of ferrioxamines. When the new compounds are added to the fermentation broths, the yield of the individual substance is improved. The term ferrioxamines signifies a group of growth-promoting substances for microorganisms containing iron or capable of binding iron in complex union. The sideramycins are antibiotics which likewise contain iron or can bind it in complex union. Their antibiotic activity results from their antagonism towards the sideramines. To this group of antibiotics belong inter alia the ferrimycins, the griseins, the albomycins, the antibiotic A 22765, the antibiotic A 1787 (Thrum) as well as the antibiotics L.A. 5352 and L.A. 5937.

The new compounds can be made by known methods.

Inter alia, in an alkylamine containing a radical convertible into a hydroxylamino group said radical can be so converted. Radicals convertible into a hydroxylamino group are for example the nitro group and the hydroxylimino group, which can be converted into the hydroxylamino group by reduction, for example by catalytic hydrogenation or reduction with a metal in the presence of a hydrogen donor such as water, acids, alkalies, or by electrolytic reduction; another suitable group is the amino group which is converted into the hydroxylamino group by electrolytic oxidation, or for example by oxidation with a peroxide such as hydrogen peroxide. Further groups convertible into the hydroxylamino group are reactive esterified hydroxyl groups, for example hydroxyl groups esterified with hydrohalic acids or sulfonic acids, which on treatment with a hydroxylamine yield the desired compounds.

According to another process a radical which is present in an alkylhydroxylamine and is convertible into an amino group is so converted. Radicals convertible into an amino group are, for example, nitrile, hydroxylamino, hydroxylimino groups as well as reactive esterified hydroxyl groups as mentioned above which on reduction or reaction with ammonia or an amine yield the desired final product.

Amino or hydroxylamino groups not participating in these reactions may be protected, for example, by acylation.

If desired, the starting materials can be formed in the course of the reaction; thus, for example, the starting material may be a dinitroalkane instead of a dihydroxylamino-alkane.

When a resulting compound contains free hydrogen atoms in the amino or hydroxylamino radicals, it can be subsequently alkylated and/or acylated. The acyl radical of acylated compounds may be split off.

Depending on the procedure used the new compounds are obtained in the form of the free bases or of their salts. From the salts the free bases can be prepared in the known manner. By treating the free bases with acids capable of forming therapeutically useful salts it is possible to prepare their salts for example those of the hydrohalic acids, sulfuric acids, phosphoric acids, nitric acid, perchloric acid; aliphatic, alicyclic, aromatic or heterocyclic carboxylic or sulfonic acids, such as formic, acetic, propionic, oxalic, succinic, glycollic, lactic, malic, tartaric, citric, ascorbic, hydroxymaleic, dihydroxymaleic or pyruvic acid; phenylacetic, benzoic, para-aminobenzoic, anthranilic, para-hydroxybenzoic, salicylic or para-aminosalicylic acid; methanesulfonic, ethanesulfonic, hydroxyethanesulfonic, ethylenesulfonic acid, toluenesulfonic, naphthalenesulfonic acids or sulfanilic acid; methionine, tryptophan, lysine, arginine, glutamine or cysteine.

It is also possible to prepare by known methods complex salts with metals, for example with iron, cobalt, magnesium or copper.

The starting materials are known or can be made by known methods.

The invention also includes any variant of the process in which a compound obtained as intermediate at any stage of the process is used as starting material and the remaining step or steps is/are carried out.

From ferrimycin the 5-hydroxylamino-pentylamine-(1) is obtained as follows:

8 grams of ferrimycin A (cf. U.S. patent application Serial No. 57,834, filed September 22, 1960, by Ernst Gaeumann et al.) are dissolved in 200 ml. of 6N-hydrochloric acid and continuously extracted with ether for 20 hours. The yellow colored ether extract is evaporated to leave behind 1.24 grams of a brown residue ($FeCl_3$).

The hydrochloric acid aqueous solution is evaporated to dryness in vacuo and dissolved in 800 ml. of 6N-hydrochloric acid. The solution is then heated at the boil for 14 hours with the exclusion of oxygen and then evaporated to dryness in vacuo. The residue is taken up in 200 ml. of N-hydrochloric acid and extracted for 24 hours with ether. From the ether extract there are obtained 1.23 grams of a crystalline residue (mainly succinic acid).

The aqueous solution is evaporated to dryness, the black-brown residue (7.65 grams) taken up in 300 ml. of alcohol, filtered off from 450 mg. of sparingly soluble black material, evaporated again and taken up in 360 ml. of water. The solution is filtered slowly through a column (7 x 28 $cm.^2$) of Dowex 1–$X_8$ (100–200 mesh) in the hydroxyl ion form and rinsed with 2 liters of water. The filtrate which has a strongly basic reaction is acidified with hydrochloric acid to yield a crystalline residue on evaporation (2.80 grams) in which three ninhydrin-positive compounds are detected paperchromatographically. Recrystallization of the residue from methanol first yields 760 mg. of ammonium chloride. The evaporated mother liquors are allowed to stand with alcohol to yield crystal needles which, after being purified via the picrate (M.P. 230–233° C. with decomposition) and being reconverted into the hydrochloride, melt at 252–254° C. (decomposition), and are identified as 1:5-diamino-pentane-dihydrochloride by the mixed melting point and infrared absorption spectrum.

After 1:5 - diamino - pentane - dihydrochloride (1.73 grams of crystalline residue) has been separated off, the mother liquors contain, according to paper-chromatography, in addition to a small quantity of 1:5-diaminopentane the third ninhydrin-positive compound. The latter reduces Fehling's solution, alkaline ferricyanide and triphenyl-tetrazolium chloride and, when subjected to exhaustive catalytic hydrogeneration with platinum oxide in 5 N-acetic acid, is quantitatively converted into 1:5-diamino-pentane. These properties and direct paper-chromatographic comparison in different solvent systems with authentic material show that it is 1-amino-5-hydroxyl-aminopentane.

When ferrioxamine B (cf. U.S. patent application Serial No. 57,834, filed September 22, 1960, by Ernst Gaeumann et al.) is hydrolysed in an analogous manner, 1-amino-5-hydroxylamino-pentane is also formed and is worked up in the manner described above and can be isolated in a pure state.

The following examples illustrate the invention:

Example 1

30 grams of 1-amino-5-nitro-pentane hydrochloride are dissolved in 360 ml. of water, cooled to 0° C., and in the course of 45 minutes 23.7 grams of zinc dust are added in portions with stirring and cooling. After stirring at 0° C. for 24 hours, the mixture is filtered on to 200 ml. of N-hydrochloric acid, rinsed thoroughly with water and evaporated in vacuo. The partially crystalline residue (34 grams) yields on being crystallized from a mixture of methanol and ether (1:1) 23.5 grams of 1-amino-5-hydroxylamino-pentane dihydrochloride in the form of colorless needles combined in clusters; M.P. 132–138° C. After being recrystallized five times from the same mixture of solvents, the product melts at 138–140° C. In the paperchromatogram (system: n-butanol concentrated hydrochloric acid+water 70:15:15) the substance, after development with ninhydrin+collidine, shows only one spot ($Rf=0.28$). It reduces Fehling's solution, alkaline ferricyanide and triphenyl-tetrazolium chloride. Equivalent weight determined by titration=97, $pK=5.19$ and 9.78. For the purpose of analysis the product is dried over phosphorous pentoxide for 15 hours at 25° C. under 0.001 mm. of pressure.

$C_2H_{16}ON_2Cl_2$ (molecular weight 191.11)—Calculated: C, 31.42; H, 8.44; N, 14.66; Cl, 37.11%. Found: C, 31.73; H, 8.46; N, 14.41; Cl, 37.20%.

The 1-amino-5-nitropentane hydrochloride used as starting material may be prepared as follows:

(a) *1-phthalimido-5-bromopentane from 1:5-dibromopentane.*—417 grams of potassium phthalimide are added in 6 equal portions in the course of 4 hours with stirring to a boiling solution of 1030 grams of 1:5-dibromo-pentane in 3 liters of acetone. The mixture is refluxed for another 24 hours. After cooling, the potassium bromide is filtered off, the acetone distilled off and the residue distilled in vacuo. The fraction boiling at 97–99° C. under 12 mm. of pressure contains unreacted 1:5-dibromopentane. After removing the remainder of the latter substance in a high vacuum an oily residue is obtained which is first crystallized in the cold from a mixture of benzene and petroleum ether, then crystallized in fractions from hot alcohol. The composition of the fractions may be checked in a thin-layer chromatogram (system: benzene+chloroform (1:1)). From alcohol 538.2 grams of 1-phthalimido-5-bromopentane crystallized in the form of colorless needles melting at 58–60° C., $Rf=0.38$ in the above system. From the mixture of benzene and petroleum ether there is obtained as by-product 1.2 grams of 1:5-diphthalimido-pentane in colorless needles melting 189–190° C., $Rf=0.09$.

(b) *1-phthalimido-5-nitropentane from 1-phthalimido-5-bromopentane.*—A solution heated at 60° C. of 533 grams of 1-phthalimido-5-bromo-pentane in 1036 grams of 1-nitropropane is treated with stirring in the course of 1½ hours while maintaining the temperature constant with 305.5 grams of silver nitrite added in small portions. The mixture is then heated one hour at 80° C., one hour at 100° C. and then one hour at 125° C. After cooling, the grey colored silver bromide is filtered off and the filtrate free from 1-nitropropane in vacuo. The oily residue is then taken up in methanol, filtered off from any insoluble material, evaporated in vacuo, taken up again in methanol and, after being filtered, evaporated. The oily residue (472 grams) is dissolved in 1.5 liters of alcohol and allowed to stand for 2 days at 0° C., 337 grams of 1-phthalimido-5-nitro-pentane separating off in the form of colorless coarse needles melting at 46–48° C.

(c) *1-amino-5-nitro-pentane hydrochloride from 1-phthalimido-5-nitro-pentane.*—337 grams of 1-phthalimido-5-nitro-pentane are suspended in 1.2 liters of alcohol and treated slowly with stirring at 22° C. with 70.8 grams of hydrazine hydrate, the starting material dissolving completely within 20 minutes. After half an hour the intermediate product separates off as a viscous gelatine-like mass which can hardly be moved by the stirrer. After diluting the reaction mass sufficiently with alcohol, stirring is continued for 4 hours at 22° C., 161 grams of concentrated hydrochloric acid are added dropwise with cooling, followed by stirring for half an hour. The precipitated phthalic hydrazide is then filtered off, washed with alcohol of 95% strength and the filtrate concentrated to a quarter of its original volume. More phthalic hydrazide precipitates, is filtered off and washed with water. The reaction mass is again concentrated, filtered off and finally evaporated to dryness to yield a residue which crystallizes from a mixture of alcohol and ether. There are obtained 144.7 grams of 1-amino-5-nitro-pentane hydrochloride in the form of colorless lamellae melting at 113–115° C. For the purpose of analysis the product is dried for 16 hours at 25° C. under 0.01 mm. pressure of mercury.

$C_5H_{13}O_2N_2Cl$ (molecular weight 168.63)—Calculated: C, 35.61; H, 7.77; N, 16.61; Cl, 21.03%. Found: C, 35.30; H, 7.75; N, 16.59; Cl, 21.16%.

Example 2

A solution of 15 g. (0.05 mol) of N-(5-bromo-pentyl)-phthalimide of melting point 58–59° C., 7.6 g. (0.05 mol) of sodium iodide and 17 g. (0.5 mol= 10-fold excess) of hydroxylamine in 5 liters of methanol is refluxed for 14 hours in an atmosphere of nitrogen. Distilling off the methanol, acidifying the residue with 4N-hydrochloric acid and extracting the neutral material by shaking it with ether leaves the hydrochloride of the base in the aqueous phase. The latter is alkalinized with ammonia solution and the base extracted 10 times with 50 ml. of chloroform each time, the extracts dried over sodium sulfate and evaporated to yield 10.1 g. of crude N-(5-hydroxyl-amino-pentyl)-phthalimide in the form of a slightly yellow-colored resin.

10 g. (0.04 mol) of this crude product are dissolved in 50 ml. of absolute alcohol, treated with 2 g. (0.04 mol) of hydrazine hydrate and the mixture left to itself for 4 hours at 25° C. The material is then acidified with 4 ml. of concentrated hydrochloric acid and allowed to stand for another half hour at 25° C. The precipitated phthalic acidhydrazide is filtered off and the filtrate concentrated to about 15 ml., then treated with 50 ml. of water to precipitate more phthalic acid hydrazide which is then filtered off. The filtrate is further concentrated, filtered, and evaporated to dryness. Crystallization from a mixture of alcohol and ether yields 3.4 g. of 5-hydroxyl-amino-pentylamine-(1)-dihydrochloride of melting point 133–136° C.

Example 3

1 molecular proportion of 5-nitropentylamino-1-hydrochloride is dissolved in 8 times its own weight in water and while keeping the temperature constant at 15° C. and stirring for 15 minutes the solution is treated with a total of 2 molecular proportions of zinc added in small portions. The mixture is stirred for 45 minutes at the same temperature and the zinc oxide is then filtered off.

The filtrate is acidified with 1.1 molecular proportions of hydrochloric acid and evaporated in vacuo to yield a faintly yellowish oil. Crystallization from a mixture of methanol and ether yields 5-hydroxyl-amino-pentylamine-(1)-dihydrochloride in 65% yield. The clustered needles melt at 134–137° C. after repeated recrystallization.

5-nitropentylamine-(1)-hydrochloride used as starting material may be prepared as follows:

(a) *N-5(-bromopentyl)-phthalimide from 1:5-dibromopentane.*—1 molecular proportion of potassium phthalimide is added in 6 equal portions within 4 hours with stirring to a boiling solution of 2 molecular proportions of 1:5-dibromopentane in three times the amount of acetone. The mixture is refluxed for 24 hours. After cooling, the potassium bromide is filtered off, the acetone distilled off and the residue distilled in vacuo. The fraction passing over between 97 and 99° C. under 12 mm. Hg pressure contains unreacted 1:5-dibromopentane. The remainder of this substance is removed from the reaction mixture in a high vacuum to leave an oily residue of N-(5-bromopentyl)-phthalimide which crystallizes in colorless needles from hot benzene or cold benzene+petroleum ether. Yield: 0.75 molecular proportion (=75% of the theoretical yield). After having been recrystallized twice it melts at 58–59° C.

(b) *N-(5-nitropentyl)-phthalimide from N-(5-bromopentyl)-phthalimide.*—A solution heated at 60° C. of 1 molecular proportion of N-(5-bromopentyl)-phthalimide in twice its amount of 1-nitropropane is treated with stirring in the course of 1½ hours with 1.1 molecular proportions of silver nitrite added in small portions. The mixture is then heated for one hour at 80° C., one hour at 100° C. and one hour at 125° C., allowed to cool, the greyish colored silver bromide is filtered off and the filtrate freed from 1-nitropropane in vacuo. The faintly yellow oily residue (1.0 molecular proportion) is n-(5-nitropentyl)-phthalimide.

(c) *5-nitropentylamine-(1)-hydrochloride from N-(5-nitropentyl)-phthalimide.*—A solution of 1 molecular proportion of N-(5-nitropentyl)-phthalimide in 5 times its own weight of absolute alcohol is treated with 1 molecular proportion of hydrazine hydrate and the mixture is kept for 4 hours at 25° C. When the reaction is complete, 1.1 molecular proportion of concentrated hydrochloric acid are added and the mixture is kept for another ½ hour at 25° C. The precipitated phthalic hydrazide is filtered off, washed with alcohol of 95% strength and the filtrate concentrated to a quarter of its original volume. Dilution with water yields more phthalic hydrazide. The reaction mixture is filtered, the filtrate again concentrated, again filtered and finally evaporated to dryness in vacuo. Crystallization from a mixture of alcohol and ether yields 5-nitropentylamino-(1)-hydrochloride in the form of colorless needles in a yield of 70%. Melting point: 113–115° C.

What is claimed is:

1. A member selected from the group consisting of N-(5-hydroxylamino-pentyl)-phthalimide and acid addition salts thereof with non-toxic acids.

2. An acid addition salt of 5-hydroxylamino-pentyl-amino-(1) with a non-toxic acid.

No references cited.